Patented June 1, 1937

2,082,161

UNITED STATES PATENT OFFICE 2,082,161

DEHYDRATION OF ANTIMONY TRIFLUOR-
IDE AND MANUFACTURE OF FLUORI-
NATED ALIPHATIC COMPOUNDS

Albert L. Henne, Columbus, Ohio, assignor, by mesne assignments, to General Motors Corporation, a corporation of Delaware No Drawing. Application January 30, 1931,
Serial No. 512,469. Renewed October 16, 1935

1 Claim. (Cl. 260—162)

This invention relates to the manufacture of fluoro and/or halo-fluoro aliphatic hydrocarbon derivatives.

The principal objects of this invention are to provide economical methods of preparing dehydrated antimony trifluoride suitable for use in the manufacture of fluoro and/or halo-fluoro aliphatic hydrocarbon derivatives, and, more particularly, to combine the dehydrating process with the fluorating process so as to avoid the cost of separate operations.

Heretofore antimony trifluoride has been used in the preparation of fluoro and/or halo-fluoro aliphatic hydrocarbon derivatives, but the antimony trifluoride has been subjected to a sublimation process in order that the reaction might be carried on in the absence of water. This sublimation has heretofore been carried out as a separate operation.

I have discovered a very effective and economical method of treating antimony trifluoride which overcomes the necessity of sublimation and which renders the antimony trifluoride particularly suitable as a starting material in the preparation of halo-fluoro hydrocarbon derivatives where a substantially dehydrated antimony trifluoride is required.

According to this invention the antimony trifluoride is placed in a retort together with a distillation agent such as benzene, gasoline, carbon tetrachloride or chloroform. The distillation agent is then evaporated without sublimation of the antimony trifluoride, leaving in the retort the dry antimony trifluoride, which can then be used as a fluorating agent. When the distillation agent is different from any of the substances which are to enter into the final reaction, as where the distillation agent is different from the derivative to be fluorated by the thus dried antimony trifluoride, it is preferable to remove the dehydrating agent, as by distillation, before starting the fluoration. When the distillation agent and one of the substances which is to enter into the final reaction are identical, as where the distillation agent and the derivative to be fluorated are the same, it may be superfluous to remove the distillation agent completely. Enough of the agent is distilled to eliminate from the antimony salt the humidity which would otherwise inhibit the fluoration, but further distillation need not be performed.

As a specific example, 50 pounds of antimony trifluoride, having a moisture content of 5%, and 50 pounds of carbon tetrachloride are placed in a vessel. The carbon tetrachloride is distilled off and carries with it the water. The antimony trifluoride left in the vessel is ready for the fluoration operation. When approximately 25 pounds of the carbon tetrachloride have been distilled off, the water content is then sufficiently low as to make optional the distillation of the remaining carbon tetrachloride. At this point the fluoration may be started. The fluoration then proceeds as follows: 3½ pounds of antimony pentachloride are added, the fluoration reaction starts and may be promoted by heating the vessel. Additional quantities of carbon tetrachloride may be added to use up all the fluoride present.

The manufacture of any particular fluorated compound may be controlled by the use of reflux apparatus and dephlegmators.

The initial step of drying the fluoride may be accomplished by putting into the vessel 50 pounds of antimony trifluoride together with 25 or more pounds of benzene, depending upon the water content of the fluoride. The benzene is distilled to dry the fluoride in the same manner as described with reference to the distilling of the first 25 pounds of carbon tetrachloride. When the fluoride has been sufficiently dried any remaining benzene may be driven off and carbon tetrachloride, together with a catalyst, may be added to start the fluoration reaction.

The first method is preferred since the dehumidifying and fluoration processes may be more closely combined.

In this process chloroform or other derivatives of aliphatic hydrocarbons may be substituted for carbon tetrachloride and gasoline, or other distillation agents may be substituted for benzene. The efficiency of the operation is improved by the use of a distillation agent with a boiling point close to 100° cent. It is still further improved when the boiling point of the distillation agent is close to and lower than the boiling point of water.

What is claimed is as follows:

The manufacture of halo-fluoro aliphatic derivatives of hydrocarbons which comprises mixing wet antimony trifluoride and an azeotropic distillation agent, evaporating the distillation agent and water from the fluoride, reacting the antimony fluoride thus obtained with a halogen derivative of an aliphatic hydrocarbon, containing a halogen other than fluorine.

ALBERT L. HENNE.